United States Patent
Bici et al.

(10) Patent No.: US 9,992,511 B2
(45) Date of Patent: Jun. 5, 2018

(54) METHOD FOR VIDEO CODING AND AN APPARATUS

(75) Inventors: Mehmet Oguz Bici, Tampere (FI); Jani Lainema, Tampere (FI); Kemal Ugur, Tampere (FI)

(73) Assignee: Nokia Technologies Oy, Espoo (FI)

( * ) Notice: Subject to any disclaimer, the term of this patent is extended or adjusted under 35 U.S.C. 154(b) by 971 days.

(21) Appl. No.: 14/352,913

(22) PCT Filed: Oct. 21, 2011

(86) PCT No.: PCT/FI2011/050926
§ 371 (c)(1),
(2), (4) Date: Jul. 21, 2014

(87) PCT Pub. No.: WO2013/057359
PCT Pub. Date: Apr. 25, 2013

(65) Prior Publication Data
US 2015/0163508 A1    Jun. 11, 2015

(51) Int. Cl.
*H04N 19/513* (2014.01)
*H04N 19/52* (2014.01)
(Continued)

(52) U.S. Cl.
CPC ........... *H04N 19/521* (2014.11); *H04N 19/52* (2014.11); *H04N 19/56* (2014.11); *H04N 19/593* (2014.11); *H04N 19/61* (2014.11)

(58) Field of Classification Search
CPC ...... H04N 19/52; H04N 19/521; H04N 19/56; H04N 19/593; H04N 19/61
(Continued)

(56) References Cited

U.S. PATENT DOCUMENTS

2004/0066848 A1 * 4/2004 Jeon ..................... H04N 19/521
                                                         375/240.15
2004/0258154 A1   12/2004 Liu et al.
(Continued)

FOREIGN PATENT DOCUMENTS

| CN | 1757238 A | 4/2006 |
| FR | 2852179 A1 | 9/2004 |
| RU | 2310231 C2 | 11/2007 |

OTHER PUBLICATIONS

Office action received for corresponding Australian Patent Application No. 2011379313, dated Apr. 4, 2017, 3 pages.
(Continued)

*Primary Examiner* — Nathnael Aynalem
(74) *Attorney, Agent, or Firm* — Alston & Bird LLP

(57) ABSTRACT

A method and apparatus are provided for encoding and decoding image information. The encoding comprises receiving a block of pixels; creating a set of motion vector prediction candidates for the block of pixels; and examining the set to determine if a motion vector prediction candidate is a temporal motion vector prediction, or a spatial motion vector prediction. If the motion vector prediction candidate is a temporal motion vector prediction, the motion vector prediction candidate is kept in the set. If the motion vector prediction candidate is a spatial motion vector prediction, it is examined whether the set comprises a motion vector prediction candidate corresponding with the spatial motion vector prediction; and if so, the motion vector prediction candidate is removed from the set. Once the set is created, one of the candidates from the set is selected to represent a motion vector prediction for the block of pixels.

18 Claims, 8 Drawing Sheets

(51) Int. Cl.
*H04N 19/56* (2014.01)
*H04N 19/61* (2014.01)
*H04N 19/593* (2014.01)

(58) Field of Classification Search
USPC ...................................... 375/240.01–240.29
See application file for complete search history.

(56) References Cited

U.S. PATENT DOCUMENTS

| | | | |
|---|---|---|---|
| 2007/0014358 A1 | 1/2007 | Tourapis et al. | |
| 2008/0152004 A1 | 6/2008 | Fujisawa et al. | |
| 2008/0232642 A1 | 9/2008 | Chang | |
| 2011/0176612 A1 | 7/2011 | Tsai et al. | |
| 2011/0211075 A1* | 9/2011 | Riemens ................ | H04N 5/144 348/180 |
| 2012/0195368 A1* | 8/2012 | Chien .................... | H04N 19/52 375/240.02 |

OTHER PUBLICATIONS

Final Office action received for corresponding Korean Patent Application No. 2014-7013515, dated Aug. 4, 2016, 4 pages of office action and no pages of office action translation available.

Wiegand et al., "WD3: Working Draft 3 of High-Efficiency Video Coding", Joint Collaborative Team on Video Coding (JCT-VC) of ITU-T SGI6 WP3 and ISO/IEC JTC1/SC29/WG11, JCTVC-E603, 5th Meeting, Mar. 16-23, 2011, 200 pages.

Office action received for corresponding Chinese Patent Application No. 201180075429.1, dated Sep. 1, 2016, 7 pages of office action and 4 pages of office action translation available.

Allowance received for corresponding Russian Patent Application No. 2014118356, dated Sep. 16, 2015, 13 pages of office action and 2 pages of office action translation available.

Extended European Search Report received for corresponding European Patent Application No. 11874346.7, dated Nov. 24, 2015, 13 pages.

Zhou, "Evaluation Results on Merge Mode in HM2.0", Joint Collaborative Team on Video Coding (JCT-VC) of ITU-T SG16 WP3 and ISO/IEC JTC1/SC29/WG11, JCTVC-E0115, 5th Meeting, Mar. 16-23, 2011, pp. 1-7.

Lin et al., "CE9: Results of Experiment ROB04", Joint Collaborative Team on Video Coding (JCT-VC) of ITU-T SG16 WP3 and ISO/IEC JTC1/SC29/WG11, JCTVC-F052, 6th Meeting, Jul. 14-22, 2011, pp. 1-7.

Laroche et al., "Result About the Combination of Experiments ROB02 and ROB04", Joint Collaborative Team on Video Coding (JCT-VC) of ITU-T SG16 WP3 and ISO/IEC JTC1/SC29/WG11, JCTVC-F713, Jul. 14-22, 2011, pp. 1-6.

Zhou et al., "A Study on HM3.0 Parsing Throughput Issue", Joint Collaborative Team on Video Coding (JCT-VC) of ITU-T SG16 WP3 and ISO/IEC JTC1/SC291WG11, JCTVC-F068, 6th Meeting, Jul. 14-22, 2011, pp. 1-17.

Zhou et al., "A Method of Decoupling Motion Data Reconstruction From Entropy Decoding", Joint Collaborative Team on Video Coding (JCT-VC) of ITU-T SG16 WP3 and ISOIIEC JTC1/SC291WG11, JCTVC-F347, 6th Meeting, Jul. 14-22, 2011, pp. 1-21.

Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803, 6th Meeting, Jul. 14-22, 2011, 229 pages.

Office action received for corresponding Korean Patent Application No. 2014-7013515, dated Aug. 20, 2015, 4 pages of office action and no pages of office action translation available.

International Search Report and Written Opinion received for corresponding Patent Cooperation Treaty Application No. PCT/FI2011/050926, dated Jul. 11, 2012, 13 pages.

Ugur et al., "High Performance, Low Complexity Video Coding and the Emerging HEVC Standard", IEEE Trans. on Circuits and Syst. for Video Technology, vol. 20, No. 12, Dec. 2010, pp. 1688-1697.

Final Office action received for corresponding Korean Patent Application No. 2014-7013515, dated May 23, 2017, 2 pages of office action and 4 pages of office action translation available.

Office Action for Korean Application No. 10-2014-7013515 dated Sep. 18, 2017, 5 pages total.

Office Action for European Application No. 11874346.7 dated Apr. 18, 2018, 5 pages.

Laroche et al., "Robust solution for the AMVP parsing issue", 96. MPEG Meeting; Mar. 3, 2011-Mar. 5, 2011, Geneva, Motion Picture Expert Group or ISO/IEC JTV1/SC29/WG11, No. m19740, dated Mar. 18, 2011.

* cited by examiner

METHOD FOR VIDEO CODING AND AN APPARATUS

RELATED APPLICATION

This application was originally filed as Patent Cooperation Treaty Application No. PCT/FI2011/050926 filed Oct. 21, 2011.

TECHNICAL FIELD

There is provided a method for encoding, a method for decoding, an apparatus, computer program products, an encoder and a decoder.

BACKGROUND INFORMATION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section A video codec may comprise an encoder which transforms input video into a compressed representation suitable for storage and/or transmission and a decoder that can uncompress the compressed video representation back into a viewable form, or either one of them. The encoder may discard some information in the original video sequence in order to represent the video in a more compact form, for example at a lower bit rate.

Many hybrid video codecs, operating for example according to the International Telecommunication Union's ITU-T H.263 and H.264 coding standards, encode video information in two phases. In the first phase, pixel values in a certain picture area or "block" are predicted. These pixel values can be predicted, for example, by motion compensation mechanisms, which involve finding and indicating an area in one of the previously encoded video frames (or a later coded video frame) that corresponds closely to the block being coded. Additionally, pixel values can be predicted by spatial mechanisms which involve finding and indicating a spatial region relationship, for example by using pixel values around the block to be coded in a specified manner.

Prediction approaches using image information from a previous (or a later) image can also be called as Inter prediction methods, and prediction approaches using image information within the same image can also be called as Intra prediction methods.

The second phase is one of coding the error between the predicted block of pixels and the original block of pixels. This may be accomplished by transforming the difference in pixel values using a specified transform. This transform may be e.g. a Discrete Cosine Transform (DCT) or a variant thereof. After transforming the difference, the transformed difference may be quantized and entropy encoded.

By varying the fidelity of the quantization process, the encoder can control the balance between the accuracy of the pixel representation, (in other words, the quality of the picture) and the size of the resulting encoded video representation (in other words, the file size or transmission bit rate).

The decoder reconstructs the output video by applying a prediction mechanism similar to that used by the encoder in order to form a predicted representation of the pixel blocks (using the motion or spatial information created by the encoder and stored in the compressed representation of the image) and prediction error decoding (the inverse operation of the prediction error coding to recover the quantized prediction error signal in the spatial domain).

After applying pixel prediction and error decoding processes the decoder combines the prediction and the prediction error signals (the pixel values) to form the output video frame.

The decoder (and encoder) may also apply additional filtering processes in order to improve the quality of the output video before passing it for display and/or storing as a prediction reference for the forthcoming frames in the video sequence.

In some video codecs, such as High Efficiency Video Coding Working Draft 4, video pictures may be divided into coding units (CU) covering the area of a picture. A coding unit consists of one or more prediction units (PU) defining the prediction process for the samples within the coding unit and one or more transform units (TU) defining the prediction error coding process for the samples in the coding unit. A coding unit may consist of a square block of samples with a size selectable from a predefined set of possible coding unit sizes. A coding unit with the maximum allowed size can be named as a largest coding unit (LCU) and the video picture may be divided into non-overlapping largest coding units. A largest coding unit can further be split into a combination of smaller coding units, e.g. by recursively splitting the largest coding unit and resultant coding units. Each resulting coding unit may have at least one prediction unit and at least one transform unit associated with it. Each prediction unit and transform unit can further be split into smaller prediction units and transform units in order to increase granularity of the prediction and prediction error coding processes, respectively. Each prediction unit may have prediction information associated with it defining what kind of a prediction is to be applied for the pixels within that prediction unit (e.g. motion vector information for inter predicted prediction units and intra prediction directionality information for intra predicted prediction units). Similarly, each transform unit may be associated with information describing the prediction error decoding process for samples within the transform unit (including e.g. discrete cosine transform (DCT) coefficient information). It may be signalled at coding unit level whether prediction error coding is applied or not for each coding unit. In the case there is no prediction error residual associated with the coding unit, it can be considered there are no transform units for the coding unit. The division of the image into coding units, and division of coding units into prediction units and transform units may be signalled in the bitstream allowing the decoder to reproduce the intended structure of these units.

In some video codecs, motion information is indicated by motion vectors associated with each motion compensated image block. These motion vectors represent the displacement of the image block in the picture to be coded (in the encoder) or decoded (at the decoder) and the prediction source block in one of the previously coded or decoded images (or pictures). In order to represent motion vectors efficiently, motion vectors may be coded differentially with respect to block specific predicted motion vector. In some video codecs, the predicted motion vectors are created in a predefined way, for example by calculating the median of the encoded or decoded motion vectors of the adjacent blocks.

Another way to create motion vector predictions is to generate a list or a set of candidate predictions from blocks in the current frame and/or co-located or other blocks in temporal reference pictures and signalling the chosen candidate as the motion vector prediction. A spatial motion vector prediction is a prediction obtained only on the basis of information of one or more blocks of the same frame than the current frame whereas temporal motion vector prediction is a prediction obtained on the basis of information of one or more blocks of a frame different from the current frame. It may also be possible to obtain motion vector predictions by combining both spatial and temporal prediction information of one or more encoded blocks. These kinds of motion vector predictions are called as spatio-temporal motion vector predictions.

In addition to predicting the motion vector values, the reference index in the reference picture list can be predicted. The reference index may be predicted from blocks in the current frame and/or co-located or other blocks in a temporal reference picture. Moreover, some high efficiency video codecs employ an additional motion information coding/decoding mechanism, often called merging/merge mode, where all the motion field information, which includes motion vector and corresponding reference picture index for each available reference picture list, is predicted and used without any modification or correction. Similarly, predicting the motion field information is carried out using the motion field information of blocks in the current frame and/or co-located or other blocks in temporal reference pictures and the used motion field information is signalled among a list of motion field candidate list filled with motion field information of available blocks in the current frame and/or co-located or other blocks in temporal reference pictures.

In some video codecs the prediction residual after motion compensation is first transformed with a transform kernel (like DCT) and then coded. The reason for this is that often there still exists some correlation among the residual and transform can in many cases help reduce this correlation and provide more efficient coding.

Some video encoders utilize Lagrangian cost functions to find optimal coding modes, e.g. the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C = D + \lambda R \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Some video codecs such as hybrid video codecs may generate a list of motion vector predictions (MVP) consisting of motion vectors of spatial adjacent blocks (spatial MVP) and/or motion vectors of blocks in a previously decoded frame (temporal MVP). One of the candidate motion vectors in the list is signalled to be used as the motion vector prediction of the current block. After the list is generated, some of the motion vector prediction candidates may have the same motion information. In this case, the identical motion vector prediction candidates may be removed to reduce redundancy. During the decoding, if the temporal motion vector prediction information is unavailable due to e.g. loss of reference frame, the decoder may not know if the temporal motion vector prediction candidate in the list is to be removed. This may lead to uncertainty for mapping the decoded candidate index to the candidates whose removal decision is based on comparing motion information with the temporal motion vector prediction. As a result, false assignment of motion vector prediction candidates may occur which may lead to degradation in the picture quality and drift of false motion information throughout the decoding process.

SUMMARY

The present invention introduces a method for generating a motion vector prediction list for an image block. The present invention provides video codecs that use temporal motion vector prediction a way to decrease the drop in picture quality when the reference temporal motion information is unavailable. This is achieved by modifying the decisions for removing the redundant motion vector prediction candidates from the motion vector prediction list. The modifications may be such that the temporal motion vector prediction is not removed from the motion vector prediction list based on a comparison with other motion vector predictions in the motion vector prediction list and other candidates are not removed from the list based on a comparison with the temporal motion vector prediction. The reconstruction quality of the picture in cases where temporal information is unavailable may be improved by the described method.

According to a first aspect of the present invention there is provided a method comprising:
 receiving a block of pixels;
 creating a set of motion vector prediction candidates for the block of pixels; said creating a set comprising:
 examining if a motion vector prediction candidate is a temporal motion vector prediction or a spatial motion vector prediction;
 if the motion vector prediction candidate is a temporal motion vector prediction, including the motion vector prediction candidate in the set;
 if the motion vector prediction candidate is based on only a spatial motion vector prediction, determining whether to include the motion vector prediction candidate in the set or not.

According to a second aspect of the present invention there is provided a method comprising:
 receiving an encoded block of pixels;
 creating a set of motion vector prediction candidates for the encoded block of pixels; said creating a set comprising:
 examining if a motion vector prediction candidate is a temporal motion vector prediction or a spatial motion vector prediction;
 if the motion vector prediction candidate is a temporal motion vector prediction, including the motion vector prediction candidate in the set;
 if the motion vector prediction candidate is based on only a spatial motion vector prediction, examining determining whether to include the motion vector prediction candidate in the set or not.

According to a third aspect of the present invention there is provided an apparatus comprising a processor and a memory including computer program code, the memory and the computer program code configured to, with the processor, cause the apparatus to:
 receive a block of pixels;
 create a set of motion vector prediction candidates for the block of pixels; said creating a set comprising:

examine if a motion vector prediction candidate is a temporal motion vector prediction or a spatial motion vector prediction;

if the motion vector prediction candidate is a temporal motion vector prediction, to include the motion vector prediction candidate in the set;

if the motion vector prediction candidate is based on only a spatial motion vector prediction, to determine whether to include the motion vector prediction candidate in the set or not.

According to a fourth aspect of the present invention there is provided an apparatus comprising a processor and a memory including computer program code, the memory and the computer program code configured to, with the processor, cause the apparatus to:

receive an encoded block of pixels;

create a set of motion vector prediction candidates for the encoded block of pixels; said creating a set comprising:

examine if a motion vector prediction candidate is a temporal motion vector prediction or a spatial motion vector prediction;

if the motion vector prediction candidate is a temporal motion vector prediction, to include the motion vector prediction candidate in the set;

if the motion vector prediction candidate is based on only a spatial motion vector prediction, to determining whether to include the motion vector prediction candidate in the set or not.

According to a fifth aspect of the present invention there is provided a storage medium having stored thereon a computer executable program code for use by an encoder, said program code comprises instructions for:

receiving a block of pixels;

creating a set of motion vector prediction candidates for the block of pixels; said creating a set comprising:

examining if a motion vector prediction candidate is a temporal motion vector prediction or a spatial motion vector prediction;

if the motion vector prediction candidate is a temporal motion vector prediction or a spatio-temporal motion vector prediction, including the motion vector prediction candidate in the set;

if the motion vector prediction candidate is based on only a spatial motion vector prediction, determining whether to include the motion vector prediction candidate in the set or not.

According to a sixth aspect of the present invention there is provided a storage medium having stored thereon a computer executable program code for use by a decoder, said program code comprises instructions for:

receiving an encoded block of pixels;

creating a set of motion vector prediction candidates for the encoded block of pixels; said creating a set comprising:

examining if a motion vector prediction candidate is a temporal motion vector prediction or a spatial motion vector prediction;

if the motion vector prediction candidate is a temporal motion vector prediction, including the motion vector prediction candidate in the set;

if the motion vector prediction candidate is based on only a spatial motion vector prediction, determining whether to include the motion vector prediction candidate in the set or not.

According to a seventh aspect of the present invention there is provided an apparatus comprising:

means for receiving a block of pixels;

means for creating a set of motion vector prediction candidates for the block of pixels; said means for creating a set comprising:

means for examining if a motion vector prediction candidate is a temporal motion vector prediction or a spatial motion vector prediction;

means for including the motion vector prediction candidate in the set, if the motion vector prediction candidate is a temporal motion vector prediction;

means for determining, if the motion vector prediction candidate is based on only a spatial motion vector prediction, whether to include the motion vector prediction candidate in the set or not.

According to an eighth aspect of the present invention there is provided an apparatus comprising:

means for receiving an encoded block of pixels;

means for creating a set of motion vector prediction candidates for the encoded block of pixels; said means for creating a set comprising:

means for examining if a motion vector prediction candidate is a temporal motion vector prediction or a spatial motion vector prediction;

means for including the motion vector prediction candidate in the set if the motion vector prediction candidate is a temporal motion vector prediction;

means for determining, if the motion vector prediction candidate is based on only a spatial motion vector prediction, whether to include the motion vector prediction candidate in the set or not.

DESCRIPTION OF THE DRAWINGS

For better understanding of the present invention, reference will now be made by way of example to the accompanying drawings in which:

FIG. 5 shows a flow diagram showing the operation of an embodiment of the invention with respect to the encoder as shown in FIG. 4a;

DETAILED DESCRIPTION

Figure 1:
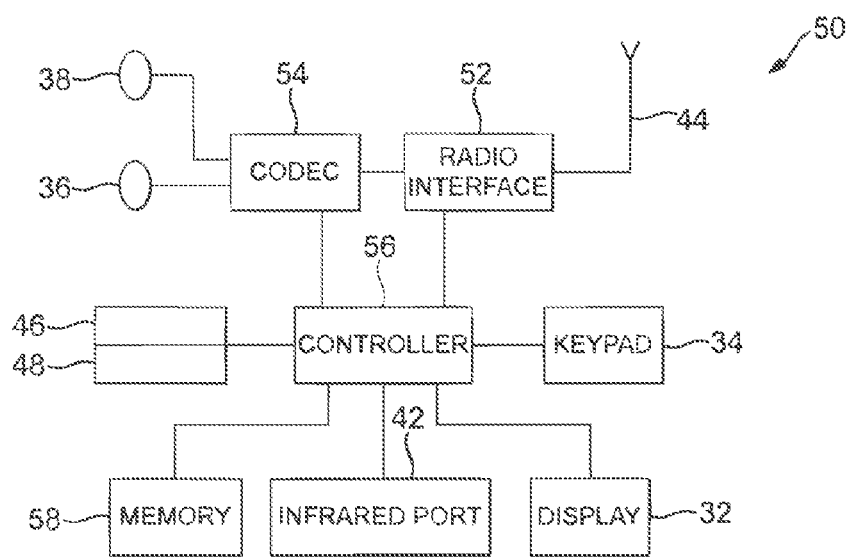
FIG. 1 shows schematically an electronic device employing some embodiments of the invention.
Figure 2:
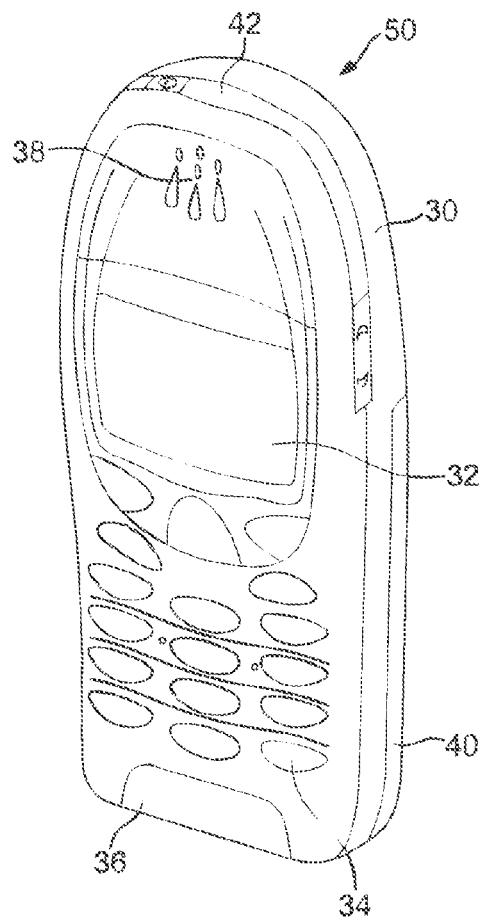
FIG. 2 shows schematically a user equipment suitable for employing some embodiments of the invention.

The following describes in further detail suitable apparatus and possible mechanisms for the provision of improving the prediction accuracy and hence possibly reducing information to be transmitted in video coding systems. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
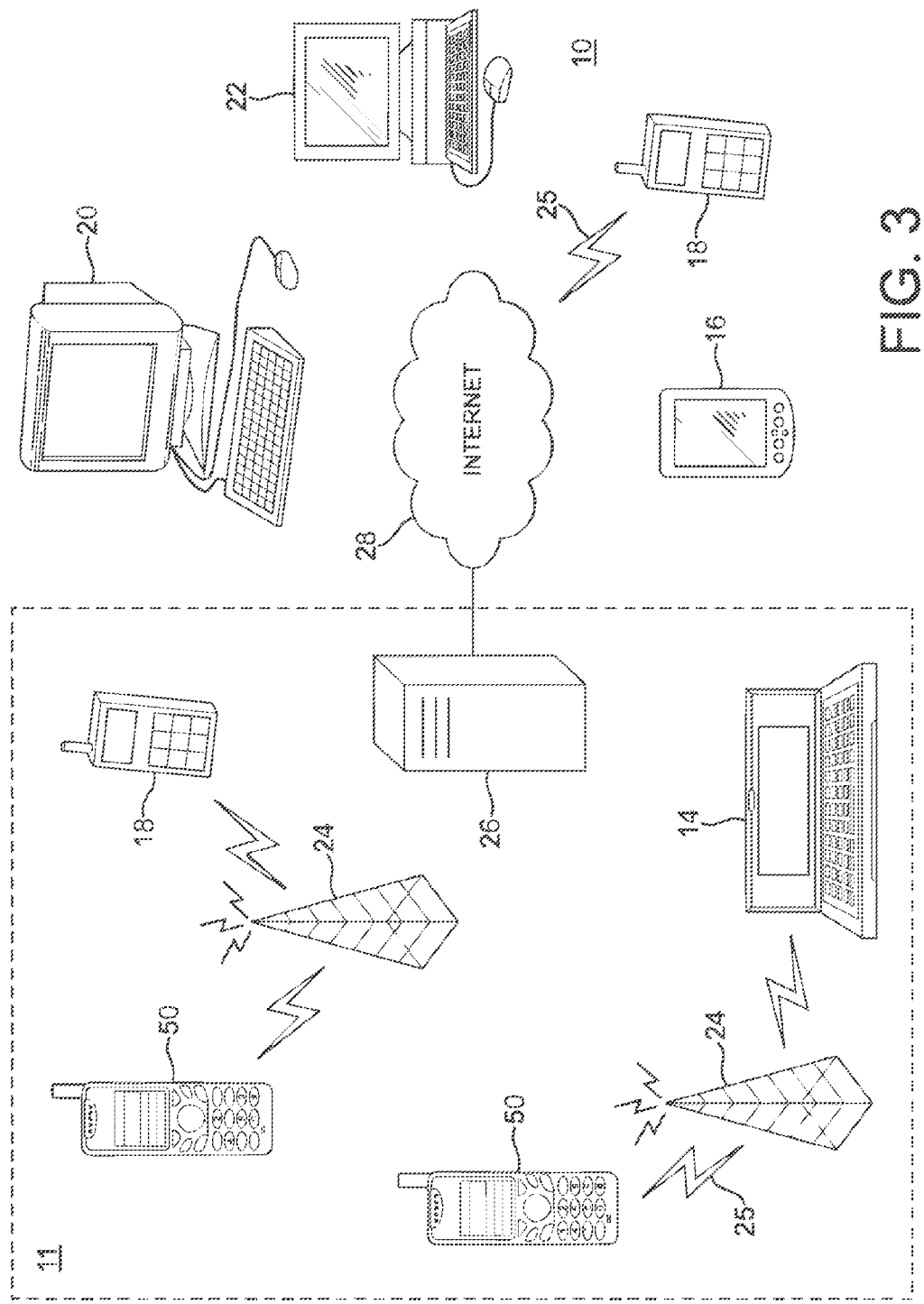
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 4A:
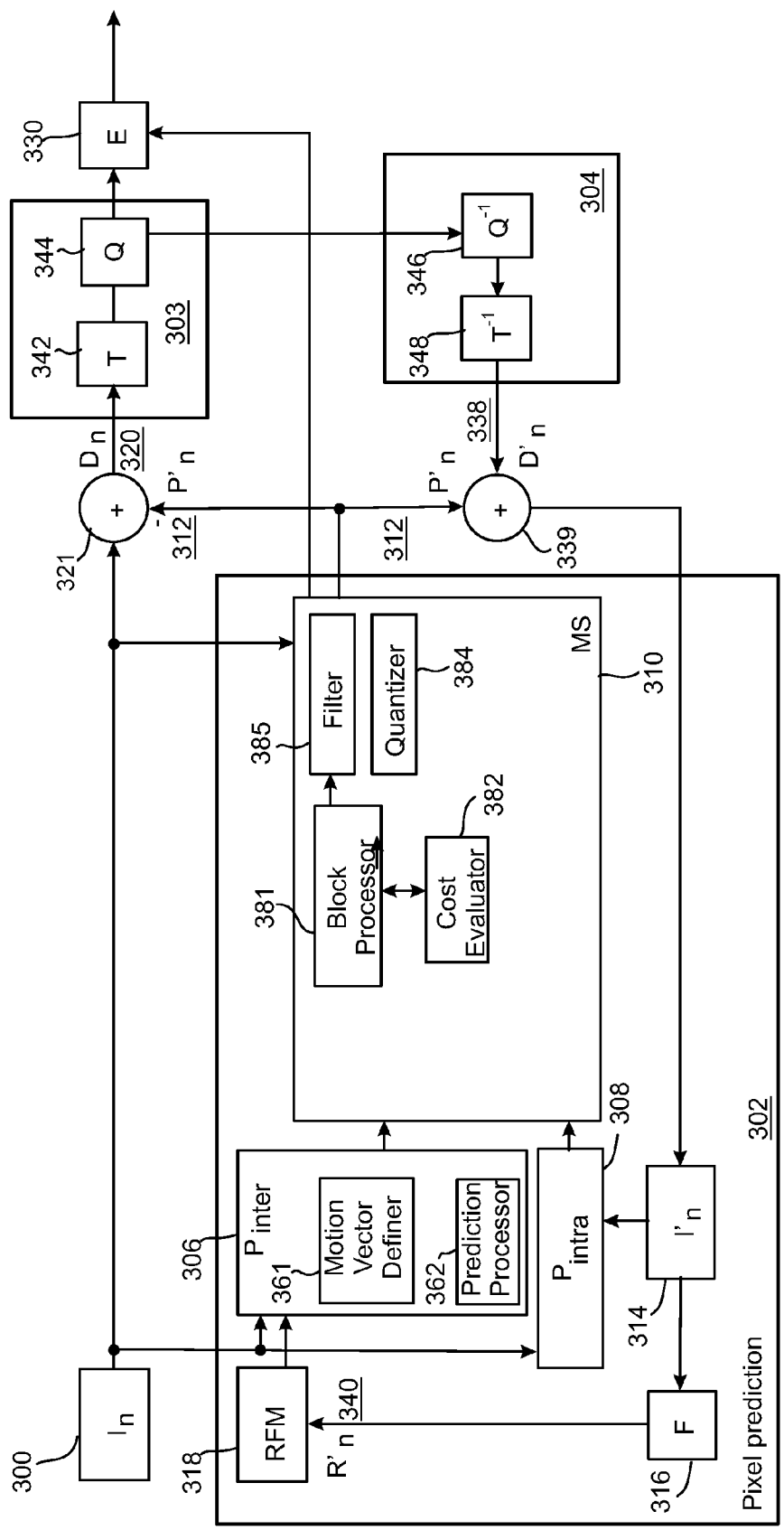
FIG. 4a shows schematically an embodiment of the invention as incorporated within an encoder.

With respect to FIG. 4a, a block diagram of a video encoder suitable for carrying out embodiments of the invention is shown. Furthermore, with respect to FIG. 5, the operation of the encoder exemplifying embodiments of the invention specifically with respect to the DC prediction is shown as a flow diagram.

FIG. 4a shows the encoder as comprising a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a filter 316, and a reference frame memory 318. In this embodiment the mode selector 310 comprises a block processor 381 and a cost evaluator 382. The encoder may further comprise an entropy encoder 330 for entropy encoding the bit stream.

Figure 4B:
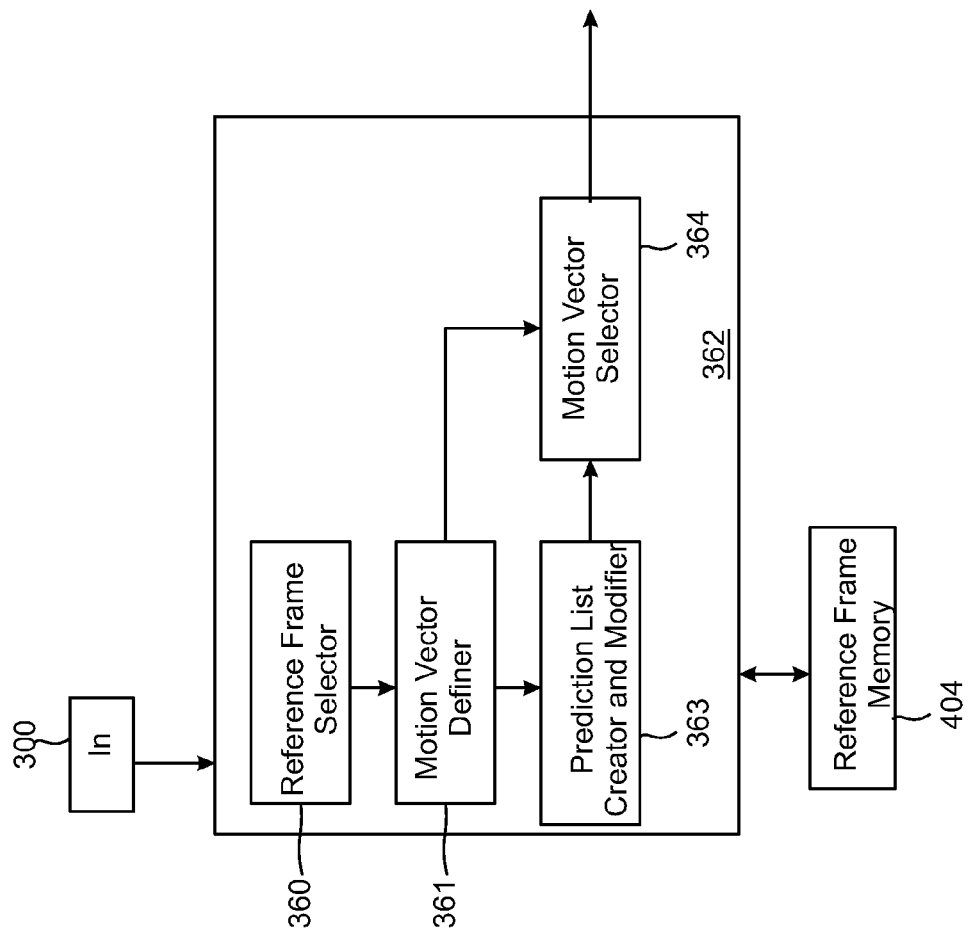
FIG. 4b shows schematically an embodiment of a prediction reference list generation and modification according to some embodiments of the invention.

FIG. 4b depicts an embodiment of the inter predictor 306. The inter predictor 306 comprises a reference frame selector 360 for selecting reference frame or frames, a motion vector definer 361, a prediction list modifier 363 and a motion vector selector 364. These elements or some of them may be part of a prediction processor 362 or they may be implemented by using other means.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the image 300.

The mode selector 310 determines which encoding mode to use to encode the current block. If the mode selector 310 decides to use an inter-prediction mode it will pass the output of the inter-predictor 306 to the output of the mode selector 310. If the mode selector 310 decides to use an intra-prediction mode (blocks 504-508) it will pass the output of one of the intra-predictor modes to the output of the mode selector 310.

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations.

The operation of the pixel predictor 302 may be configured to carry out any known pixel prediction algorithm known in the art.

The pixel predictor 302 may also comprise a filter 385 to filter the predicted values before outputting them from the pixel predictor 302.

The operation of the prediction error encoder 302 and prediction error decoder 304 will be described hereafter in further detail. In the following examples the encoder generates images in terms of 16×16 pixel macroblocks which go to form the full image or picture. Thus, for the following examples the pixel predictor 302 outputs a series of predicted macroblocks of size 16×16 pixels and the first summing device 321 outputs a series of 16×16 pixel residual data macroblocks which may represent the difference between a first macro-block in the image 300 against a predicted macro-block (output of pixel predictor 302). It would be appreciated that other size macro blocks may be used.

The prediction error encoder 303 comprises a transform block 342 and a quantizer 344. The transform block 342 transforms the first prediction error signal 320 to a transform domain. The transform is, for example, the DCT transform. The quantizer 344 quantizes the transform domain signal, e.g. the DCT coefficients, to form quantized coefficients.

The prediction error decoder 304 receives the output from the prediction error encoder 303 and performs the opposite processes of the prediction error encoder 303 to produce a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal and an inverse transformation block 348, which performs the inverse transformation to the reconstructed transform signal wherein the output of the inverse transformation block 348 contains reconstructed block(s). The prediction error decoder may also comprise a macroblock filter (not shown) which may filter the reconstructed macroblock according to further decoded information and filter parameters.

In the following the operation of an example embodiment of the inter predictor 306 will be described in more detail. The inter predictor 306 receives 504 the current block for inter prediction. It is assumed that for the current block there already exists one or more neighboring blocks which have been encoded and motion vectors have been defined for them. For example, the block on the left side and/or the block above the current block may be such blocks. Spatial motion vector predictions for the current block can be formed e.g. by using the motion vectors of the encoded neighboring blocks and/or of non-neighbor blocks in the same slice or frame, using linear or non-linear functions of spatial motion vector predictions, using a combination of various spatial motion vector predictors with linear or non-linear operations, or by any other appropriate means that do not make use of temporal reference information. It may also be possible to obtain motion vector predictors by combining both spatial and temporal prediction information of one or more encoded blocks. These kinds of motion vector predictors may also be called as spatio-temporal motion vector predictors.

Reference frames used in encoding the neighboring blocks have been stored to the reference frame memory 404. The reference frames may be short term references or long term references and each reference frame may have a unique index which points to the reference frame in the reference frame memory. When a reference frame is no longer used as a reference frame it may be removed from the reference frame memory or marked as a non-reference frame wherein the storage location of that reference frame may be occupied for a new reference frame. In addition to the reference frames of the neighboring blocks the reference frame selector 360 may also select one or more other frames as potential reference frames and store them to the reference frame memory.

Motion vector information of encoded blocks is also stored into the memory so that the inter predictor 306 is able to retrieve the motion vector information when processing motion vector candidates for the current block.

In some embodiments the motion vectors are stored into one or more lists. For example, motion vectors of uni-directionally predicted frames (e.g. P-frames) may be stored to a list called as list 0. For bi-directionally predicted frames (e.g. B-frames) there may be two lists (list 0 and list 1) and for multi-predicted frames there may be more than two lists. Reference frame indices possibly associated with the motion vectors may also be stored in one or more lists.

In some embodiments there may be two or more motion vector prediction procedures and each procedure may have its own candidate set creation process. In one procedure, only the motion vector values are used. In another procedure, which may be called as a Merge Mode, each candidate element may comprise 1) The information whether 'block was uni-predicted using only list 0' or 'block was uni-predicted using only list 1' or 'block was bi-predicted using list 0 and list 1' 2) motion vector value for list 0 3) Reference picture index in list 0 4) motion vector value for list 1 5) Reference picture index list 1. Therefore, whenever two prediction candidates are to be compared, not only the motion vector values are compared, but also the five values mentioned above are compared to determine whether they correspond with each other or not.

The motion vector definer 361 defines candidate motion vectors for the current frame by using one or more of the motion vectors of one or more neighbor blocks and/or other blocks of the current block in the same frame and/or co-located blocks and/or other blocks of the current block in one or more other frames. These candidate motion vectors can be called as a set of candidate predictors or a predictor set. Each candidate predictor thus represents the motion vector of one or more already encoded block. In some embodiments the motion vector of the candidate predictor is set equal to the motion vector of a neighbor block for the same list if the current block and the neighbor block refer to the same reference frames for that list. Also for temporal prediction there may be one or more previously encoded frames wherein motion vectors of a co-located block or other blocks in a previously encoded frame can be selected as candidate predictors for the current block. The temporal motion vector predictor candidate can be generated by any means that make use of the frames other than the current frame.

The candidate motion vectors can also be obtained by using more than one motion vector of one or more other blocks such as neighbor blocks of the current block and/or co-located blocks in one or more other frames. As an example, any combination of the motion vector of the block to the left of the current block, the motion vector of the block above the current block, and the motion vector of the block at the up-right corner of the current block may be used (i.e. the block to the right of the block above the current block). The combination may be a median of the motion vectors or calculated by using other formulas. For example, one or more of the motion vectors to be used in the combination may be scaled by a scaling factor, an offset may be added, and/or a constant motion vector may be added. In some embodiments the combined motion vector is based on both temporal and spatial motion vectors, e.g. the motion vector of one or more of the neighbor block or other block of the current block and the motion vector of a co-located block or other block in another frame.

If a neighbor block does not have any motion vector information a default motion vector such as a zero motion vector may be used instead.

Creating additional or extra motion vector predictions based on previously added predictors may be needed when the current number of candidates is limited or insufficient. This kind of creating additional candidates can be performed by combining previous two predictions and/or processing one previous candidate by scaling or adding offset and/or adding a zero motion vector with various reference indices.

Hence, the motion vector definer 361 may examine how many motion vector candidates can be defined and how many potential candidate motion vectors exist for the current block. If the number of potential motion vector candidates is smaller than a threshold, the motion vector definer 361 may create additional motion vector predictions.

In some embodiments the combined motion vector can be based on motion vectors in different lists. For example, one motion vector may be defined by combining one motion vector from the list 0 and one motion vector from the list 1 e.g. when the neighboring or co-located block is a bi-directionally predicted block and there exists one motion vector in the list 0 and one motion vector in the list 1 for the bi-directionally predicted block.

To distinguish the current block from the encoded/decoded blocks the motion vectors of which are used as candidate motion vectors, those encoded/decoded blocks are also called as reference blocks in this application.

In some embodiments not only the motion vector information of the reference block(s) is obtained (e.g. by copying) but also a reference index of the reference block in the reference picture list is copied to the candidate list. The information whether the block was un-predicted using only list 0 or the block was uni-predicted using only list 1 or the block was bi-predicted using list 0 and list 1 may also be copied. The candidate list may also be called as a candidate set or a set of motion vector prediction candidates.

Figure 6A:
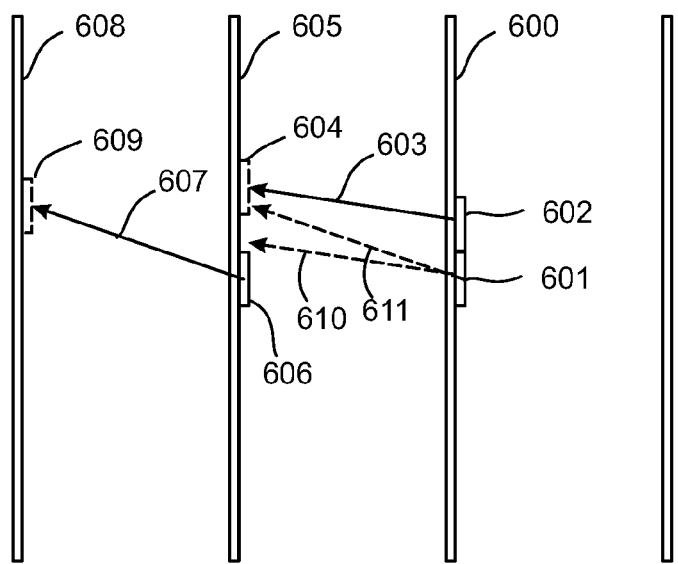
FIG. 6a illustrates an example of spatial and temporal prediction of a prediction unit.

FIG. 6a illustrates an example of spatial and temporal prediction of a prediction unit. There is depicted the current block 601 in the frame 600 and a neighbor block 602 which already has been encoded. The motion vector definer 361 has defined a motion vector 603 for the neighbor block 602 which points to a block 604 in the previous frame 605. This motion vector can be used as a potential spatial motion vector prediction 610 for the current block. FIG. 6a depicts that a co-located block 606 in the previous frame 605, i.e. the block at the same location than the current block but in the previous frame, has a motion vector 607 pointing to a block 609 in another frame 608. This motion vector 607 can be used as a potential temporal motion vector prediction-611 for the current frame.

Figure 6B:
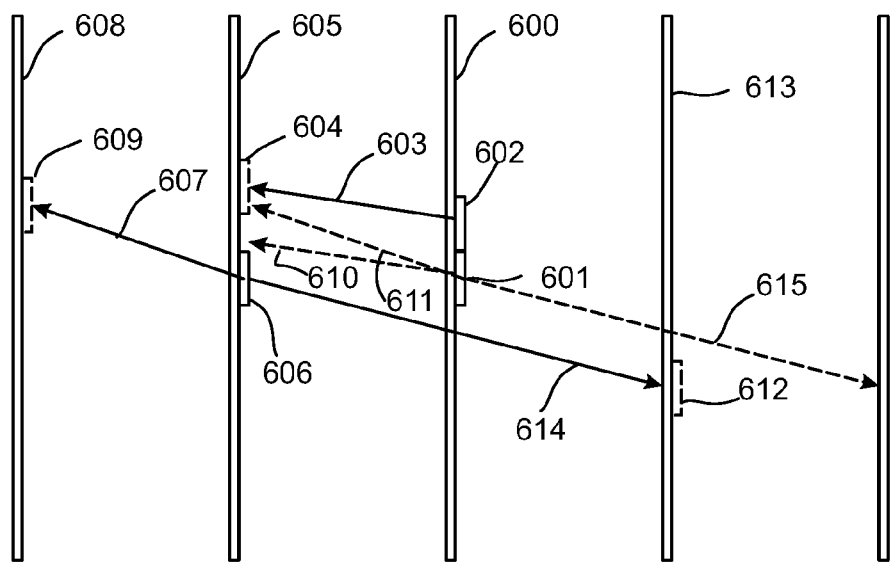
FIG. 6b illustrates another example of spatial and temporal prediction of a prediction unit.

FIG. 6b illustrates another example of spatial and temporal prediction of a prediction unit. In this example the block 606 of the previous frame 605 uses bi-directional prediction based on the block 609 of the frame preceding the frame 605 and on the block 612 succeeding the current frame 600. The temporal motion vector prediction for the current block 601 may be formed by using both the motion vectors 607, 614 or either of them.

Figure 5:
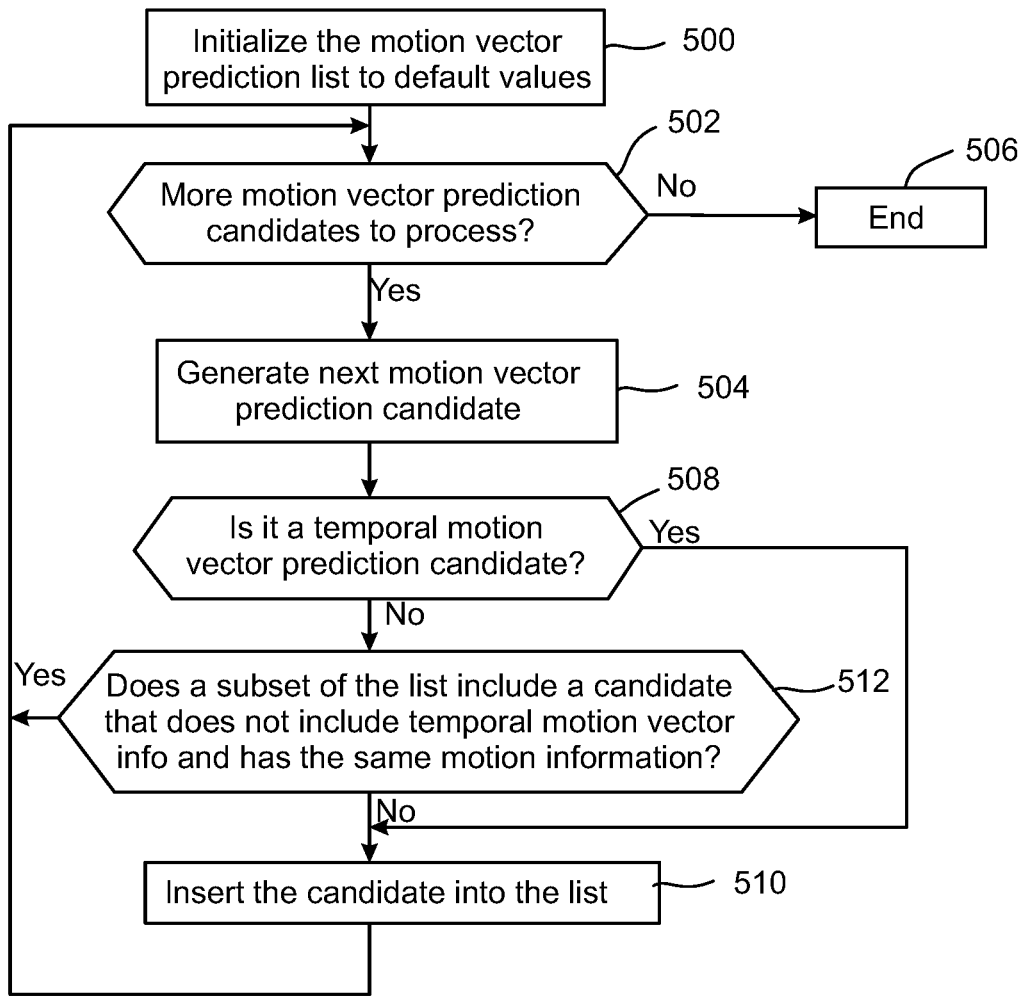

The operation of the prediction list modifier 363 will now be described in more detail with reference to the flow diagram of FIG. 5. The prediction list modifier 363 initializes a motion vector prediction list to default values in block 500. The prediction list modifier 363 may also initialize a list index to an initial value such as zero. Then, in block 502 the prediction list modifier checks whether there are any motion vector candidates to process. If there is at least one motion vector candidate in the predictor set for processing, the prediction list modifier 363 generates 504 the next motion vector candidate which may be a temporal motion vector or a spatial motion vector. If the prediction list modifier determined in block 502 that there are no motion vector candidates left, the modification of the motion vector prediction list may be ended 506. From block 504 the process continues in block 508. The prediction list modifier 363 examines whether the current motion vector prediction is a temporal motion vector prediction or not. If it is a temporal motion vector prediction the motion vector prediction is inserted 510 to the prediction list and no comparison that uses temporal data with previously added motion vector predictions is performed. The added motion vector prediction may be accompanied with the list index and the list index may be incremented by one or by some other constant so that the list index indicates the next position in the motion vector prediction list. If the current motion vector prediction is not a temporal motion vector prediction and does not contain any motion vector information which is based on temporal data the prediction list modifier 363 compares 512 the motion vector of the current motion vector prediction with the motion vector info of the motion vector predictions in the list. Such motion vector predictions which contain temporal motion vector prediction info are excluded from the comparison. Some other spatial motion vector predictors may be excluded as well for different reasons such as for reducing complexity. In other words, those motion vector predictions in which motion vector information contains temporal information are not taken into the comparison although the motion vector prediction were partly based on spatial motion vectors. Such situations may occur e.g. when a motion vector prediction is combined from temporal and spatial motion vectors.

The comparison can be an identicality/equivalence check or comparing the (absolute) difference against a threshold or any other similarity metric.

If similar spatial motion vector info is found from the list, the current motion vector prediction is not added to the list. The added motion vector prediction may be accompanied with the list index and the list index may be incremented by one or by some other constant so that the list index indicates the next position in the motion vector prediction list. Then the process returns to block 502 to check, if this was the last candidate motion vector prediction to process. Otherwise, the current motion vector prediction is added 510 to the list and the process returns to block 502. Hence, when duplicate spatial motion vector predictions exist, the spatial motion vector prediction which has the smallest index in the list may be maintained in the list (the earliest occurrence of such spatial motion vector prediction in the list construction process) and duplicate spatial motion vector predictions having higher indices are not added to the list.

During the process of removal of redundant candidates, comparison between motion vector predictor candidates can be based on any other information than the motion vector values. For example, it can be based on linear or non-linear functions of motion vector values, coding or prediction types of the blocks used to obtain the motion information, block size, the spatial location in the frame/(largest) coding unit/macroblock, the information whether blocks share the same motion with a block, the information whether blocks are in the same coding/prediction unit, etc.

As can be determined from the above the method does not include duplicate motion vector info for spatial motion vector predictions and does not remove duplicate motion vector info for temporal motion vector predictions if such exist in the motion vector prediction candidates.

There may also be more than one temporal motion vector predictors in the motion vector predictor candidate list. In this case, all the temporal motion vector predictors are retained in the list. Moreover, during the removing redundant spatial motion vector predictor process, none of the temporal motion vector predictors are used.

An example description of the invention for constructing merging candidate list is as follows. A1, if available; B1, if available; B0, if available; A0, if available; B2, if available; Co1. A1, B1, B0, A0, B2 and Co1 correspond to whole motion field information (comprising 1) The information whether 'block was uni-predicted using only list 0' or 'block was uni-predicted using only list 1' or 'block was bi-predicted using list 0 and list 1' 2) motion vector value for list 0 3) Reference picture index in list 0 4) motion vector value for list 1 5) Reference picture index list 1) for different blocks. A1 corresponds to the bottom-most block on the left side of the current block, A0 corresponds to the block below the A1 block, B1 corresponds to the right-most block above the current block, B0 corresponds to the block on the right side of the B1 block, B2 corresponds to the block on the top-left corner of of the current block, and Co1 corresponds to the bottom-right corner or central co-located block of the current block in another frame. The merging candidate list may be merged by removing candidates which have the same motion vectors and the same reference indices except the merging candidate which has the smallest order in the merging candidate list and except the Co1 merging candidate.

In some situations a temporal motion vector predictor may be removed from the candidate list based on information that is available even if the reference frame needed to generate the temporal motion vector predictor is unavailable.

In some embodiments the location of the temporal motion vector predictor in the motion vector predictor candidate list can be adjusted to any of the places. For example, the temporal motion vector predictor can always be the top or the last element in the motion vector predictor candidate list.

For the motion vector predictor candidate list generation process, each list candidate can include more information than the motion vector value, such as the reference lists used, the reference frames used in each list and motion vector for each list.

During the creation of a new motion vector predictor candidate, if information related to the temporal motion vector predictor may be used, the creation of motion vector predictor candidate can be modified such that the information related to the temporal motion vector predictor is discarded.

During the creation of a new motion vector predictor candidate, if information related to the temporal motion vector predictor is used, the new candidate can be discarded.

When all motion vector candidates have been examined, one motion vector is selected to be used as the motion vector for the current block. The motion vector selector 364 may examine different motion vectors in the list and determine which motion vector provides the most efficient encoding result, or the selection of the motion vector may be based on to other criteria as well. Information of the selected motion vector is provided for the mode selector for encoding and transmission to the decoder or for storage when the mode selector determines to use inter prediction for the current block. The information may include the index of the motion vector in the list, and/or motion vector parameters or other appropriate information.

The selected motion vector and the block relating to the motion vector is used to generate the prediction representation of the image block 312 which is provided as the output of the mode selector. The output may be used by the first summing device 321 to produce the first prediction error signal 320, as was described above.

The selected motion vector predictor candidate can be modified by adding a motion vector difference or can be used directly as the motion vector of the block. Moreover, after the motion compensation is performed by using the selected motion vector predictor candidate, the residual signal of the block can be transform coded or skipped to be coded.

Although the embodiments above have been described with respect to the size of the macroblock being 16×16 pixels, it would be appreciated that the methods and apparatus described may be configured to handle macroblocks of different pixel sizes.

Figure 7:
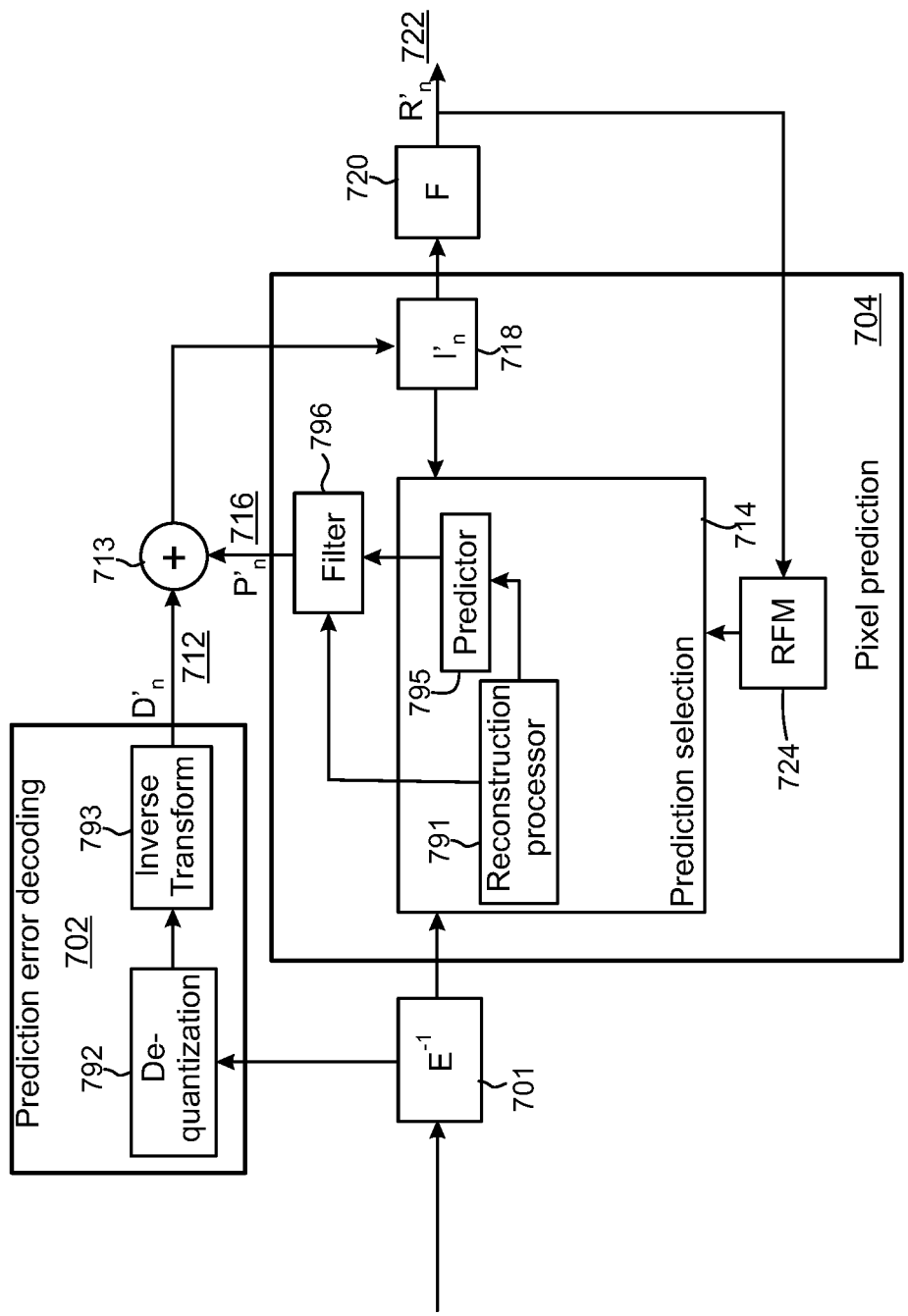
FIG. 7 shows schematically an embodiment of the invention as incorporated within a decoder.

In the following the operation of an example embodiment of the decoder 600 is depicted in more detail with reference to FIG. 7.

Figure 8:
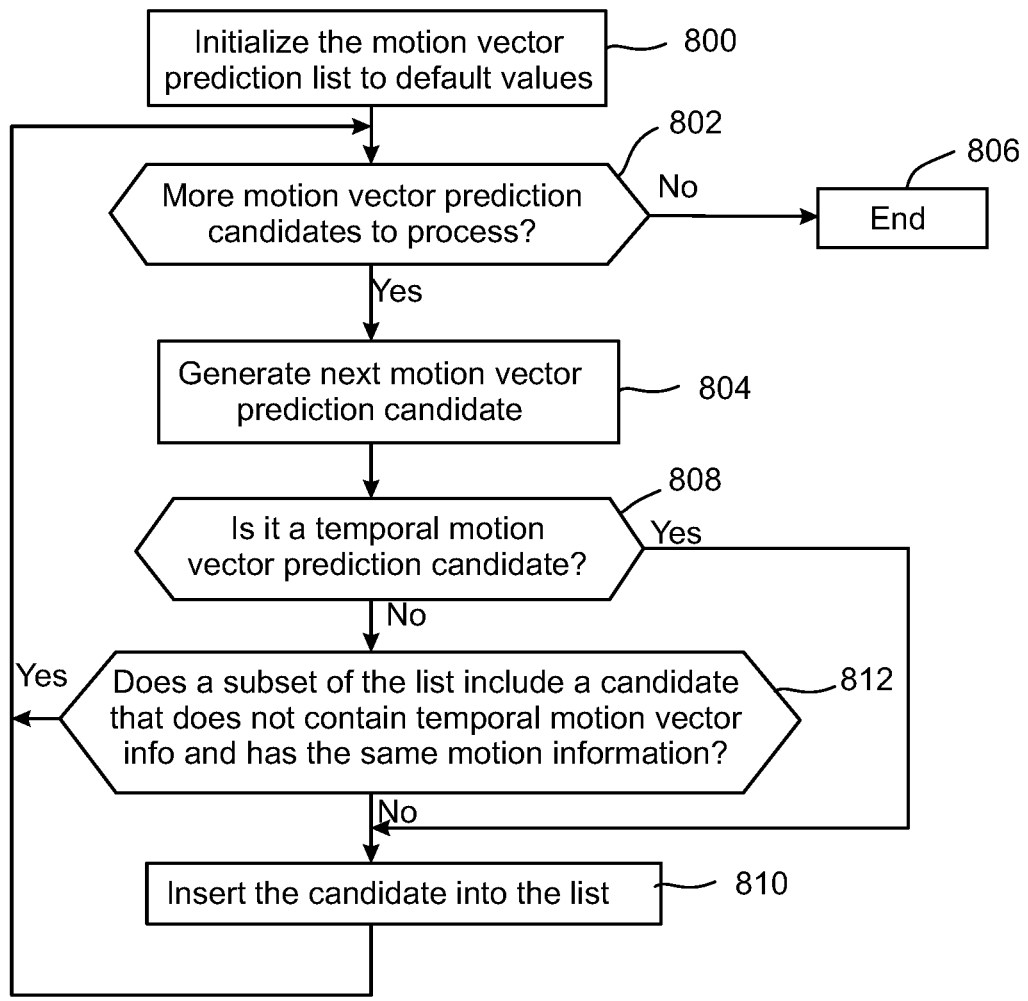
FIG. 8 shows a flow diagram of showing the operation of an embodiment of the invention with respect to the decoder shown in FIG. 7.

At the decoder side similar operations are performed to reconstruct the image blocks. FIG. 7 shows a block diagram of a video decoder 700 suitable for employing embodiments of the invention and FIG. 8 shows a flow diagram of an example of a method in the video decoder. The bitstream to be decoded may be received from the encoder, from a network element, from a storage medium or from another source. The decoder is aware of the structure of the bitstream so that it can determine the meaning of the entropy coded codewords and may decode the bitstream by an entropy decoder 701 which performs entropy decoding on the received signal. The entropy decoder thus performs the inverse operation to the entropy encoder 330 of the encoder described above. The entropy decoder 701 outputs the results of the entropy decoding to a prediction error decoder 702 and a pixel predictor 704.

In some embodiments the entropy coding may not be used but another channel encoding may be in use, or the encoded bitstream may be provided to the decoder 700 without channel encoding. The decoder 700 may comprise a corresponding channel decoder to obtain the encoded codewords from the received signal.

The pixel predictor 704 receives the output of the entropy decoder 701. The output of the entropy decoder 701 may include an indication on the prediction mode used in encoding the current block. A predictor selector 714 within the pixel predictor 704 determines that an intra-prediction or an inter-prediction is to be carried out. The predictor selector 714 may furthermore output a predicted representation of an image block 716 to a first combiner 713. The predicted representation of the image block 716 is used in conjunction with the reconstructed prediction error signal 712 to generate a preliminary reconstructed image 718. The preliminary reconstructed image 718 may be used in the predictor 714 or may be passed to a filter 720. The filter 720, if used, applies a filtering which outputs a final reconstructed signal 722. The final reconstructed signal 722 may be stored in a reference frame memory 724, the reference frame memory 724 further being connected to the predictor 714 for prediction operations.

Also the prediction error decoder 702 receives the output of the entropy decoder 701. A dequantizer 792 of the prediction error decoder 702 may dequantize the output of the entropy decoder 701 and the inverse transform block 793 may perform an inverse transform operation to the dequantized signal output by the dequantizer 792. The output of the entropy decoder 701 may also indicate that prediction error signal is not to be applied and in this case the prediction error decoder produces an all zero output signal.

The decoder selects the 16×16 pixel residual macroblock to reconstruct. This residual macroblock is also called as a current block.

The decoder may receive information on the encoding mode used in encoding of the current block. The indication is decoded, when necessary, and provided to the reconstruction processor 791 of the prediction selector 714. The reconstruction processor 791 examines the indication and selects one of the intra-prediction, if the indication indicates that the block has been encoded using intra-prediction, or the inter-prediction mode, if the indication indicates that the block has been encoded using inter-prediction.

For inter-prediction mode(s) the reconstruction processor 791 may comprise one or more elements corresponding to the prediction processor 362 of the encoder, such as a motion vector definer, a prediction list modifier and/or a motion vector selector.

The reconstruction processor 791 initializes a motion vector prediction list to default values in block 800. Then, in block 802 the reconstruction processor 791 checks whether there are any motion vector candidates to process. If there is at least one motion vector candidate in the predictor set for processing, the reconstruction processor 791 generates 804 the next motion vector candidate which may be a temporal motion vector or a spatial motion vector. If the reconstruction processor 791 determined in block 802 that there are no motion vector candidates left, the modification of the motion vector prediction list may be ended 806. From block 804 the process continues in block 808. The reconstruction processor 791 examines whether the current motion vector prediction is a temporal motion vector prediction or not. If it is a temporal motion vector prediction the motion vector prediction is inserted 810 to the prediction list. As was the case in the encoder, such motion vector predictions which contain temporal motion vector prediction info are excluded from the comparison and are added to the list by the reconstruction processor 791. If the current motion vector prediction is not a temporal motion vector prediction the reconstruction processor 791 compares 812 the motion vector of the current motion vector prediction with the motion vector info of the motion vector predictions in the motion vector prediction list. If similar motion vector info is found from the list, the current motion vector prediction is not added to the list and the process returns to block 802 to check, if this was the last motion vector prediction to process. Otherwise, the current motion vector prediction is added 810 to the list and the process returns to block 802.

When the list has been constructed the decoder may use the indication of the motion vector received from the encoder to select the motion vector for decoding the current block. The indication may be, for example, an index to the list.

Basically, after the reconstruction processor 791 has constructed the motion vector prediction list, it would correspond with the motion vector prediction list constructed by the encoder if the reconstruction processor 791 has the same information available than the encoder had. If some information has been lost during transmission the information from the encoder to the decoder, it may affect the generation of the motion vector prediction list in the decoder 700. However, because the temporal motion vector predictions are maintained in the list the probabilities that the decoder 700 is able to correctly construct the motion vector prediction list may be higher compared to the situation that all duplicate motion vector predictions were removed.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

In some embodiments a method comprises:

receiving a block of pixels;

creating a set of motion vector prediction candidates for the block of pixels; said creating a set comprising:

examining if a motion vector prediction candidate is a temporal motion vector prediction or a spatial motion vector prediction;

if the motion vector prediction candidate is a temporal motion vector prediction, including the motion vector prediction candidate in the set;

if the motion vector prediction candidate is based on only a spatial motion vector prediction, determining whether to include the motion vector prediction candidate in the set or not.

In some embodiments a method comprises:

receiving a block of pixels; creating a set of motion vector prediction candidates for the block of pixels; said creating a set comprising:

examining if a motion vector prediction candidate is a temporal motion vector prediction or a spatial motion vector prediction or a spatio-temporal motion vector prediction;

if the motion vector prediction candidate is a temporal motion vector prediction or a spatio-temporal motion vector prediction, including the motion vector prediction candidate in the set;

if the motion vector prediction candidate is based on only a spatial motion vector prediction, determining whether to include the motion vector prediction candidate in the set or not.

In some embodiments a method comprises:

receiving an encoded block of pixels;

creating a set of motion vector prediction candidates for the encoded block of pixels; said creating a set comprising:

examining if a motion vector prediction candidate is a temporal motion vector prediction or a spatial motion vector prediction;

if the motion vector prediction candidate is a temporal motion vector prediction, including the motion vector prediction in the set;

if the motion vector prediction candidate is based on only a spatial motion vector prediction, determining whether to include the motion vector prediction candidate in the set or not.

In some embodiments a method comprises:

receiving an encoded block of pixels;

creating a set of motion vector prediction candidates for the encoded block of pixels; said creating a set comprising:

examining if a motion vector prediction candidate is a temporal motion vector prediction or a spatial motion vector prediction or a spatio-temporal motion vector prediction;

if the motion vector prediction candidate is a temporal motion vector prediction or a spatio-temporal motion vector prediction, including the motion vector prediction in the set;

if the motion vector prediction candidate is based on only a spatial motion vector prediction, determining whether to include the motion vector prediction candidate in the set or not.

In some embodiments an apparatus comprises a processor and a memory including computer program code, the memory and the computer program code configured to, with the processor, cause the apparatus to:

receiving a block of pixels;

creating a set of motion vector prediction candidates for the block of pixels; said creating a set comprising:

examining if a motion vector prediction candidate is a temporal motion vector prediction or a spatial motion vector prediction;

if the motion vector prediction candidate is a temporal motion vector prediction, including the motion vector prediction in the set;

if the motion vector prediction candidate is based on only a spatial motion vector prediction, determining whether to include the motion vector prediction candidate in the set or not.

In some embodiments an apparatus comprises a processor and a memory including computer program code, the memory and the computer program code configured to, with the processor, cause the apparatus to:

receiving a block of pixels;

creating a set of motion vector prediction candidates for the block of pixels; said creating a set comprising:

examining if a motion vector prediction candidate is a temporal motion vector prediction or a spatial motion vector prediction or a spatio-temporal motion vector prediction;

if the motion vector prediction candidate is a temporal motion vector prediction or a spatio-temporal motion vector prediction, including the motion vector prediction in the set;

if the motion vector prediction candidate is based on only a spatial motion vector prediction, determining whether to include the motion vector prediction candidate in the set or not.

In some embodiments an apparatus comprises a processor and a memory including computer program code, the memory and the computer program code configured to, with the processor, cause the apparatus:

receive an encoded block of pixels;

create a set of motion vector prediction candidates for the encoded block of pixels; said creating a set comprising:

examine if a motion vector prediction candidate is a temporal motion vector prediction or a spatial motion vector prediction;

if the motion vector prediction candidate is a temporal motion vector prediction, to include the motion vector prediction in the set;

if the motion vector prediction candidate is based on only a spatial motion vector prediction, to determine whether to include the motion vector prediction candidate in the set or not.

In some embodiments an apparatus comprises a processor and a memory including computer program code, the memory and the computer program code configured to, with the processor, cause the apparatus:

receive an encoded block of pixels;

create a set of motion vector prediction candidates for the encoded block of pixels; said creating a set comprising:

examine if a motion vector prediction candidate is a temporal motion vector prediction or a spatial motion vector prediction or a spatio-temporal motion vector prediction;

if the motion vector prediction candidate is a temporal motion vector prediction or a spatio-temporal motion vector prediction, to include the motion vector prediction in the set;

if the motion vector prediction candidate is based on only a spatial motion vector prediction, to determine whether to include the motion vector prediction candidate in the set or not.

In some embodiments a storage medium having stored thereon a computer program code a computer executable program code for use by an encoder, said program codes comprise instructions for use by an encoder, said program code comprises instructions for:

receiving a block of pixels;

creating a set of motion vector prediction candidates for the block of pixels; said creating a set comprising:

examining if a motion vector prediction candidate is a temporal motion vector prediction or a spatial motion vector prediction;

if the motion vector prediction candidate is a temporal motion vector prediction, including the motion vector prediction in the set;

if the motion vector prediction candidate is based on only a spatial motion vector prediction, determining whether to include the motion vector prediction candidate in the set or not.

In some embodiments a storage medium having stored thereon a computer program code a computer executable program code for use by an encoder, said program codes comprise instructions for use by an encoder, said program code comprises instructions for:

receiving a block of pixels;

creating a set of motion vector prediction candidates for the block of pixels; said creating a set comprising:

examining if a motion vector prediction candidate is a temporal motion vector prediction or a spatial motion vector prediction or a spatio-temporal motion vector prediction;

if the motion vector prediction candidate is a temporal motion vector prediction or a spatio-temporal motion vector prediction, including the motion vector prediction in the set;

if the motion vector prediction candidate is based on only a spatial motion vector prediction, determining whether to include the motion vector prediction candidate in the set or not.

In some embodiments a storage medium having stored thereon a computer program code a computer executable program code for use by an encoder, said program codes comprise instructions for use by an encoder, said program code comprises instructions for:

receiving an encoded block of pixels;

creating a set of motion vector prediction candidates for the encoded block of pixels; said creating a set comprising:

examining if a motion vector prediction candidate is a temporal motion vector prediction or a spatial motion vector prediction;

if the motion vector prediction candidate is a temporal motion vector prediction or a spatio-temporal motion vector prediction, including the motion vector prediction in the set;

if the motion vector prediction candidate is based on only a spatial motion vector prediction, determining whether to include the motion vector prediction candidate in the set or not.

In some embodiments a storage medium having stored thereon a computer program code a computer executable program code for use by an encoder, said program codes comprise instructions for use by an encoder, said program code comprises instructions for:

receiving an encoded block of pixels;

creating a set of motion vector prediction candidates for the encoded block of pixels; said creating a set comprising:

examining if a motion vector prediction candidate is a temporal motion vector prediction or a spatial motion vector prediction or a spatio-temporal motion vector prediction;

if the motion vector prediction candidate is a temporal motion vector prediction or a spatio-temporal motion vector prediction or a spatio-temporal motion vector prediction, including the motion vector prediction in the set;

if the motion vector prediction candidate is based on only a spatial motion vector prediction, determining whether to include the motion vector prediction candidate in the set or not.

In some embodiments an apparatus comprises:

means for receiving a block of pixels;

means for creating a set of motion vector prediction candidates for the block of pixels; said means for creating a set comprising:

means for examining if a motion vector prediction candidate is a temporal motion vector prediction or a spatial motion vector prediction;

means for including the motion vector prediction in the set, if the motion vector prediction candidate is a temporal motion vector prediction;

means for determining, if the motion vector prediction candidate is based on only a spatial motion vector prediction, whether to include the motion vector prediction candidate in the set or not.

In some embodiments an apparatus comprises:

means for receiving a block of pixels;

means for creating a set of motion vector prediction candidates for the block of pixels; said means for creating a set comprising:

means for examining if a motion vector prediction candidate is a temporal motion vector prediction or a spatial motion vector prediction or a spatio-temporal motion vector prediction;

means for including the motion vector prediction in the set, if the motion vector prediction candidate is a temporal motion vector prediction or a spatio-temporal motion vector prediction;

means for determining, if the motion vector prediction candidate is based on only a spatial motion vector prediction, whether to include the motion vector prediction candidate in the set or not.

In some embodiments an apparatus comprises:

means for receiving an encoded block of pixels;

means for creating a set of motion vector prediction candidates for the encoded block of pixels; said means for creating a set comprising:

means for examining if a motion vector prediction candidate is a temporal motion vector prediction, a spatial motion vector prediction or a spatio-temporal motion vector prediction;

means for including the motion vector prediction in the set if the motion vector prediction candidate is a temporal motion vector prediction or a spatio-temporal motion vector prediction;

means for determining, if the motion vector prediction candidate is based on only a spatial motion vector prediction, whether to include the motion vector prediction candidate in the set or not.

In some embodiments an apparatus comprises:

means for receiving an encoded block of pixels;

means for creating a set of motion vector prediction candidates for the encoded block of pixels; said means for creating a set comprising:

means for examining if a motion vector prediction candidate is a temporal motion vector prediction, a spatial motion vector prediction or a spatio-temporal motion vector prediction;

means for including the motion vector prediction in the set if the motion vector prediction candidate is a temporal motion vector prediction or a spatio-temporal motion vector prediction;

means for determining, if the motion vector prediction candidate is based on only a spatial motion vector prediction, whether to include the motion vector prediction candidate in the set or not.

The invention claimed is:

1. A method for encoding an image, the method comprising:

receiving a block of pixels;

creating, by a codec, a set of motion vector prediction candidates for the block of pixels; said creating the set comprising:

examining if a motion vector prediction candidate is a temporal motion vector prediction or a spatial motion vector prediction, wherein the temporal motion vector prediction is at least partly based on one or more encoded blocks in a frame different from the frame of the block of pixels and the spatial motion vector prediction is only based on one or more encoded blocks in the same frame as the frame of the block of pixels;

if the motion vector prediction candidate is a temporal motion vector prediction, including the motion vector prediction candidate in the set without comparing the motion vector prediction candidate with other motion vector prediction candidates in the set;

if the motion vector prediction candidate is based on only a spatial motion vector prediction, comparing motion vector information of the motion vector prediction candidate with motion vector information of a spatial motion vector prediction candidate in the set, and determining whether to include the motion vector prediction candidate in the set or not based on a value of the motion vector prediction candidate and a value of at least one spatial motion vector already included in the set; and selecting, by the codec, one motion vector prediction candidate from the set to represent a motion vector prediction for the block of pixels.

2. The method according to claim 1, wherein said determining comprising at least one of the following:

comparing motion vector information of the motion vector prediction candidate with motion vector information of a spatial motion vector prediction candidate;

comparing a reference index of the motion vector prediction candidate with a reference index of a spatial motion vector prediction candidate, which has been included in the set;

examining whether the motion vector prediction candidate is generated by processing one or more than one motion vector prediction candidates or not based on the value of the motion vector prediction candidate and the value of at least one spatial motion vector already included in the set.

3. The method according to claim 1, further comprising:
creating an additional motion vector prediction candidate based on one or more previously added motion vector predictors in the set.

4. The method according to claim 1, wherein each motion vector prediction candidate is associated with an index in the set, and if a motion vector prediction candidate is determined to be removed due to motion vector information corresponding with another motion vector prediction candidate, the method further comprising:
examining the index of the motion vector prediction candidate and the index of the another motion vector prediction candidate, and
removing the motion vector prediction candidate which has greater index.

5. A method for decoding an encoded image, the method comprising:
receiving an encoded block of pixels;
creating, by a codec, a set of motion vector prediction candidates for the encoded block of pixels; said creating the set comprising:
examining if a motion vector prediction candidate is a temporal motion vector prediction or a spatial motion vector prediction, wherein the temporal motion vector prediction is at least partly based on one or more motion vectors of a decoded block in a frame different from the frame of the block of pixels and the spatial motion vector prediction is only based on one or more motion vectors of another decoded block in the same frame than the frame of the block of pixels;
if the motion vector prediction candidate is a temporal motion vector prediction, including the motion vector prediction in the set without comparing the motion vector prediction candidate with other motion vector prediction candidates in the set;
if the motion vector prediction candidate is based on only a spatial motion vector prediction, comparing motion vector information of the motion vector prediction candidate with motion vector information of a spatial motion vector prediction candidate in the set, and determining whether to include the motion vector prediction candidate in the set or not based on a value of the motion vector prediction candidate and a value of at least one spatial motion vector already included in the set; and
selecting, by the codec, one motion vector prediction candidate from the set to represent a motion vector prediction for the block of pixels.

6. The method according to claim 5, wherein said determining comprising at least one of the following:
comparing motion vector information of the motion vector prediction candidate with motion vector information of a spatial motion vector prediction candidate;
comparing a reference index of the motion vector prediction candidate with a reference index of a spatial motion vector prediction candidate, which has been included in the set;
examining whether the motion vector prediction candidate is generated by processing one or more than one motion vector prediction candidates or not based on the value of the motion vector prediction candidate and the value of at least one spatial motion vector already included in the set.

7. The method according to claim 5, further comprising:
creating an additional motion vector prediction candidate based on one or more previously added motion vector predictors in the set.

8. The method according to claim 5, wherein each motion vector prediction candidate is associated with an index in the set, and if a motion vector prediction candidate is determined to be removed due to motion vector information corresponding with another motion vector prediction candidate, the method further comprising:
examining the index of the motion vector prediction candidate and the index of the another motion vector prediction candidate, and
removing the motion vector prediction candidate which has greater index.

9. An apparatus embodied by a codec for encoding an image, the apparatus comprising:
a processor and
a memory including computer program code, the memory and the computer program code configured to, with the processor, cause the apparatus to:
receive a block of pixels;
create a set of motion vector prediction candidates for the block of pixels; computer program code to create the set cause the apparatus to:
examine if a motion vector prediction candidate is a temporal motion vector prediction or a spatial motion vector prediction, wherein the temporal motion vector prediction is at least partly based on one or more motion vectors of an encoded block in a frame different from the frame of the block of pixels and the spatial motion vector prediction is only based on one or more motion vectors of another encoded block in the same frame than the frame of the block of pixels;
if the motion vector prediction candidate is a temporal motion vector prediction, include the motion vector prediction in the set without comparing the motion vector prediction candidate with other motion vector prediction candidates in the set;
if the motion vector prediction candidate is based on only a spatial motion vector prediction, compare motion vector information of the motion vector prediction candidate with motion vector information of a spatial motion vector prediction candidate in the set, and determine whether to include the motion vector prediction candidate in the set or not based on a value of the motion vector prediction candidate and a value of at least one spatial motion vector already included in the set; and
select one motion vector prediction candidate from the set to represent a motion vector prediction for the block of pixels.

10. The apparatus according to claim 9, wherein the computer program code to determine whether to include the motion vector prediction candidate in the set or not cause apparatus perform at least one of the following:
to compare motion vector information of the motion vector prediction candidate with motion vector information of a spatial motion vector prediction candidate;
to compare a reference index of the motion vector prediction candidate with a reference index of a spatial motion vector prediction candidate, which has been included in the set;
to examine whether the motion vector prediction candidate is generated by processing one or more than one motion vector prediction candidates or not based on the value of the motion vector prediction candidate and the value of at least one spatial motion vector already included in the set.

11. The apparatus according to claim 9 comprising further computer program code configured to, with the processor, cause the apparatus to create an additional motion vector prediction candidate based on one or more previously added motion vector predictors in the set.

12. The apparatus according to claim 9, wherein each motion vector prediction candidate is associated with an index in the set, and if a motion vector prediction candidate is determined to be removed due to motion vector information corresponding with another motion vector prediction candidate, the apparatus further comprises computer program code configured to, with the processor, cause the apparatus to
examine the index of the motion vector prediction candidate and the index of the another motion vector prediction candidate, and
remove the motion vector prediction candidate which has greater index.

13. An apparatus embodied by a codec for decoding an encoded image, the apparatus comprising:
a processor and
a memory including computer program code, the memory and the computer program code configured to, with the processor, cause the apparatus to:
receive an encoded block of pixels;
create a set of motion vector prediction candidates for the encoded block of pixels; computer program code to create the set cause the apparatus to:
examine if a motion vector prediction candidate is a temporal motion vector prediction or a spatial motion vector prediction, wherein the temporal motion vector prediction is at least partly based on one or more motion vectors of a decoded block in a frame different from the frame of the block of pixels and the spatial motion vector prediction is only based on one or more motion vectors of another decoded block in the same frame than the frame of the block of pixels;
if the motion vector prediction candidate is a temporal motion vector prediction, to include the motion vector prediction in the set without comparing the motion vector prediction candidate with other motion vector prediction candidates in the set;
if the motion vector prediction candidate is based on only a spatial motion vector prediction, to compare motion vector information of the motion vector prediction candidate with motion vector information of a spatial motion vector prediction candidate in the set, and to determine whether to include the motion vector prediction candidate in the set or not based on a value of the motion vector prediction candidate and a value of at least one spatial motion vector already included in the set; and
select one motion vector prediction candidate from the set to represent a motion vector prediction for the block of pixels.

14. The apparatus according to claim 13, wherein the computer program code to determine whether to include the motion vector prediction candidate in the set or not cause apparatus perform at least one of the following:
to compare motion vector information of the motion vector prediction candidate with motion vector information of a spatial motion vector prediction candidate;
to compare a reference index of the motion vector prediction candidate with a reference index of a spatial motion vector prediction candidate, which has been included in the set;
to examine whether the motion vector prediction candidate is generated by processing one or more than one motion vector prediction candidates or not based on the value of the motion vector prediction candidate and the value of at least one spatial motion vector already included in the set.

15. The apparatus according to claim 13 comprising further computer program code configured to, with the processor, cause the apparatus to create an additional motion vector prediction candidate based on one or more previously added motion vector predictors in the set.

16. The apparatus according to claim 13, wherein each motion vector prediction candidate is associated with an index in the set, and if a motion vector prediction candidate is determined to be removed due to motion vector information corresponding with another motion vector prediction candidate, the apparatus further comprises computer program code configured to, with the processor, cause the apparatus to
examine the index of the motion vector prediction candidate and the index of the another motion vector prediction candidate, and
remove the motion vector prediction candidate which has greater index.

17. A non-transitory machine-readable medium having instructions stored therein, which when executed by a processor of a codec, cause the processor to perform a method for decoding an encoded image, the method comprising:
receiving an encoded block of pixels;
creating a set of motion vector prediction candidates for the encoded block of pixels; said creating the set comprising:
examining if a motion vector prediction candidate is a temporal motion vector prediction or a spatial motion vector prediction, wherein the temporal motion vector prediction is at least partly based on one or more motion vectors of a decoded block in a frame different from the frame of the block of pixels and the spatial motion vector prediction is only based on one or more motion vectors of another decoded block in the same frame than the frame of the block of pixels;
if the motion vector prediction candidate is a temporal motion vector prediction, including the motion vector prediction in the set without comparing the motion vector prediction candidate with other motion vector prediction candidates in the set;
if the motion vector prediction candidate is based on only a spatial motion vector prediction, comparing motion vector information of the motion vector prediction candidate with motion vector information of a spatial motion vector prediction candidate in the set, and determining whether to include the motion vector prediction candidate in the set or not based on a value of the motion vector prediction candidate and a value of at least one spatial motion vector already included in the set; and
selecting one motion vector prediction candidate from the set to represent a motion vector prediction for the block of pixels.

18. The non-transitory machine-readable medium according to claim 17, wherein said determining comprising at least one of the following:

comparing motion vector information of the motion vector prediction candidate with motion vector information of a spatial motion vector prediction candidate;

comparing a reference index of the motion vector prediction candidate with a reference index of a spatial motion vector prediction candidate, which has been included in the set;

examining whether the motion vector prediction candidate is generated by processing one or more than one motion vector prediction candidates or not based on the value of the motion vector prediction candidate and the value of at least one spatial motion vector already included in the set.

* * * * *